US011888366B2

(12) United States Patent
Heikel et al.

(10) Patent No.: US 11,888,366 B2
(45) Date of Patent: Jan. 30, 2024

(54) ELECTRIC INDUCTION MACHINE

(71) Applicant: ABB Schweiz AG, Baden (CH)

(72) Inventors: Mikael Heikel, Helsinki (FI); Mark Szucs-Bartfai, Helsinki (FI); Aron Szucs, Helsinki (FI); Blanka Szucs-Bartfai, Helsinki (FI); Zsolt Kovacs, Helsinki (FI); Jan Westerlund, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/134,712

(22) Filed: Dec. 28, 2020

(65) Prior Publication Data

US 2021/0119521 A1 Apr. 22, 2021

Related U.S. Application Data

(63) Continuation of application No. PCT/EP2019/067314, filed on Jun. 28, 2019.

(30) Foreign Application Priority Data

Jun. 29, 2018 (EP) .................................... 18180967

(51) Int. Cl.
*H02K 17/20* (2006.01)
*H02K 17/42* (2006.01)

(52) U.S. Cl.
CPC ............ *H02K 17/20* (2013.01); *H02K 17/42* (2013.01); *H02K 2213/03* (2013.01)

(58) Field of Classification Search
CPC ...... H02K 17/00; H02K 17/16; H02K 17/165; H02K 17/18; H02K 17/185; H02K 17/20; H02K 17/205; H02K 17/42

(Continued)

(56) References Cited

U.S. PATENT DOCUMENTS 1,094,389 A * 4/1914 Howe ...................... H02K 5/10 310/211
2,039,199 A * 4/1936 Swendsen ................ H02K 9/06 310/268

(Continued)

FOREIGN PATENT DOCUMENTS

JP S602379 U 1/1985
JP 2012-239352 A 12/2012

(Continued)

OTHER PUBLICATIONS

European Patent Office, International Search Report & Written Opinion issued in corresponding Application No. PCT/EP2019/067314, dated Jul. 25, 2019, 12 pp.

(Continued)

*Primary Examiner* — Tran N Nguyen
(74) *Attorney, Agent, or Firm* — Leydig, Voit & Mayer, Ltd.

(57) ABSTRACT

The disclosure relates to an electric induction machine in which a chamfer region is provided between each respective rotor groove and rotor bar at a position corresponding to a radially outer internal corner region of the rotor groove. Suitably, the chamfer region has a relative magnetic permeability less than that of the rotor frame, and an electrical resistivity higher than that of the rotor bar. Moreover, a minimum diameter of the chamfer region is suitably larger than a manufacturing-tolerances derived maximum clearance between the respective rotor groove and robot bar, if any.

19 Claims, 6 Drawing Sheets

7b 9 3 7a 7 8 7b 9 3 7a 6

(58) Field of Classification Search
USPC .......................................... 310/201, 211, 212
See application file for complete search history.

(56) References Cited

U.S. PATENT DOCUMENTS 2,447,657 A * 8/1948 Ludwig .................. H02K 17/16 416/178
2006/0163959 A1* 7/2006 Ogawa ..................... H02K 3/38 310/201
2007/0063609 A1* 3/2007 Durham ............... H02K 19/103 310/166
2008/0136274 A1* 6/2008 Fujii .................... H02K 15/085 310/201
2010/0243197 A1* 9/2010 Osborne ................ H02K 15/02 164/520
2012/0091850 A1* 4/2012 Sawahata ............. H02K 17/165 310/211
2013/0049507 A1* 2/2013 Lang ...................... H02K 17/00 310/90.5
2014/0028146 A1 1/2014 Sugimoto et al.
2014/0049134 A1 2/2014 Koka et al.
2015/0381020 A1* 12/2015 Wang ................... H02K 17/165 419/10
2017/0373545 A1* 12/2017 Zhong ...................... H02K 5/08
2018/0166959 A1* 6/2018 Finkle .................. H02K 17/165

FOREIGN PATENT DOCUMENTS

JP WO2017/141334 A1 2/2018
WO WO2016117003 * 7/2016 ............. H02K 15/00

OTHER PUBLICATIONS

European Patent Office, Search Report issued in corresponding Application No. 18180967.4, dated Nov. 29, 2018, 3 pp.

Kunihiro et al., "Investigation Into Loss Reduced Rotor Slot Structure by Analyzing Local Behaviors of Harmonic Magnetic Fluxes in Inverter-Fed Induction Motor," IEEE Transactions on Industry Applications, vol. 53, No. 2, Mar./Apr. 2017, pp. 1070-1077.

Narbutovskih, P., "Power losses in induction machines," Electrical Engineering, IEEE, New York, vol. 54, No. 7, Jul. 1, 1935, pp. 764-766.

Korean Intellectual Property Office, Office Action in Korean Patent Application No. 10-2020-7037160, 11 pp. (dated Oct. 21, 2022).

* cited by examiner

ELECTRIC INDUCTION MACHINE

FIELD OF THE DISCLOSURE

The present disclosure relates to induction machines, and more particularly to electric motors and generators. The present disclosure further concerns the arrangement of rotor bars and rotor groove of such induction machines.

BACKGROUND OF THE DISCLOSURE

In induction machines, particularly in the ones having a rotor assembly of the squirrel cage-type, rotor bars are closely fitted within corresponding rotor grooves of the rotor frame.

The magnetic flux used to induce a current in the rotor bars and consequently magnetize the rotor, also encompasses magnetic flux harmonics, which have been found to induce eddy currents not contributing towards the operation of the induction machines, but increase losses and reduce efficiency thereof.

A high-density region of such eddy currents has been found to be induced at a radially outer corner area of the rotor bar. Previous attempts to attenuate these eddy currents have been focused on re-shaping the corner area, while maintaining the configuration of having the rotor bar closely fitted with the rotor groove. However, such attempts have not been able to provide optimal results.

BRIEF DESCRIPTION OF THE DISCLOSURE

An object of the present disclosure is to provide an induction machine so as to alleviate induction of eddy currents at rotor bars' corner regions of such an induction machine.

The object of the disclosure is achieved by the induction machine characterized by what is stated in the independent claim. The preferred embodiments of the disclosure are disclosed in the dependent claims.

The disclosure is based on the idea of providing a chamfer region at a position where eddy currents are typically induced, i.e. a radially outer internal corner region of the rotor groove.

Providing the chamfer regions effectively prevents, or at least reduces, the induction of eddy currents at the radially outer internal corner region of the rotor groove. Simultaneously, such a chamfer region maintains the magnetic saliency of the rotor groove, as compared to prior art arrangements, thus contributing to torque creation.

Suitably, the chamfer region has a relatively low magnetic permeability with respect to the rotor frame and a relatively high electrical resistivity with respect to the rotor bar.

An advantage of such an induction machine is that losses caused by eddy currents are significantly reduced without substantially reducing the performance of the induction machine.

BRIEF DESCRIPTION OF THE DRAWINGS

In the following the disclosure will be described in greater detail by means of preferred embodiments with reference to the accompanying drawings, in which FIG. 1 schematically illustrates a portion of an induction machine according to the present disclosure as a cross sectional view.

DETAILED DESCRIPTION OF THE DISCLOSURE

Figure 1:
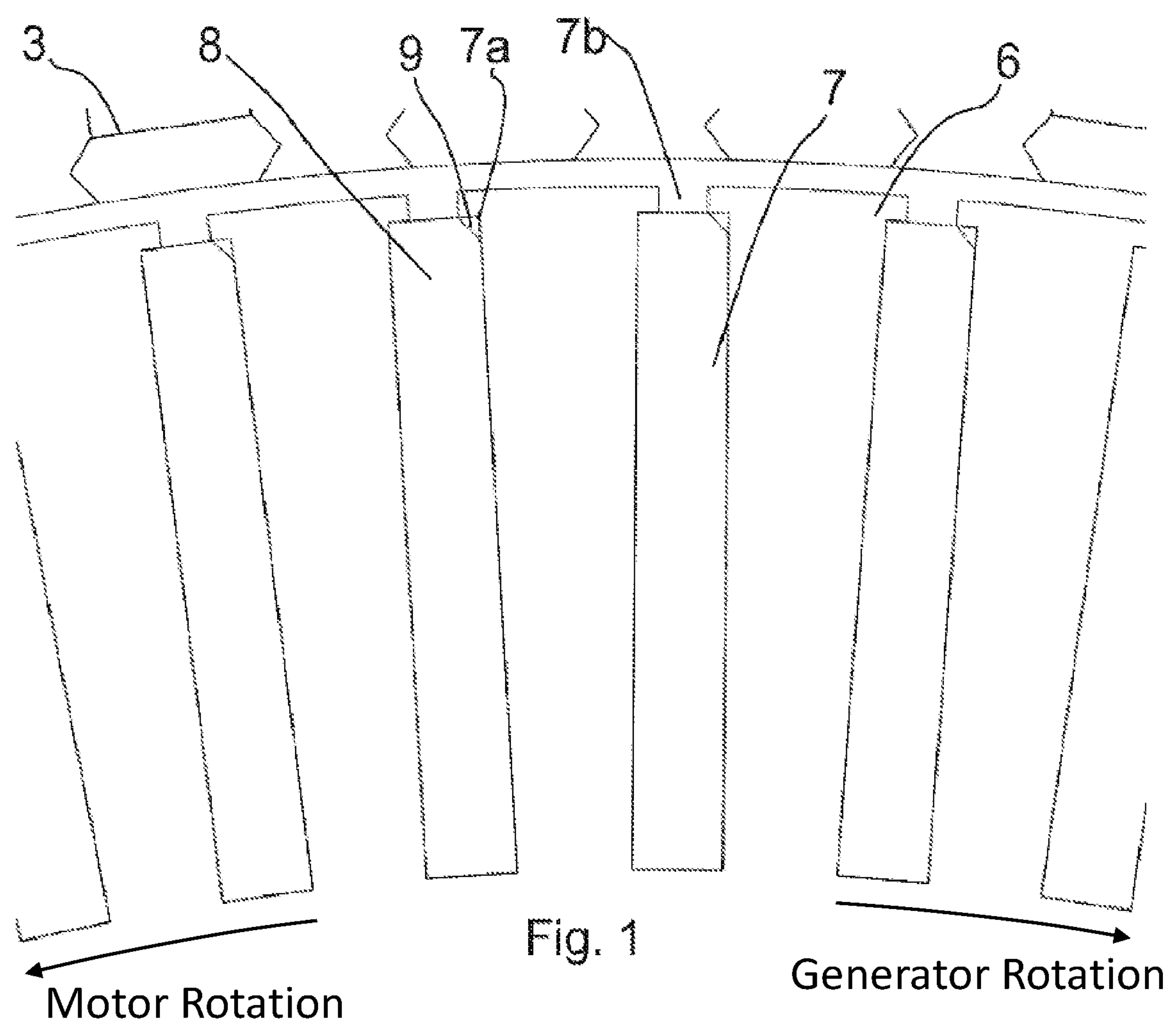

According to the present disclosure, an electric induction machine 1 is provided. The Induction machine comprises a housing 2 having an inner space, a stator assembly 3 arranged annularly within the inner space of the housing and a shaft 4 rotatably supported so as to concentrically extend through the stator assembly 3.

A rotor assembly 5 is provided as fixed to and surrounding the shaft 4 within the inner space, the rotor assembly 5 being disposed concentrically with and inside the stator assembly 3. The rotor assembly 5 further comprises a cylindrical rotor frame 6.

A plurality of axially extending longitudinal rotor grooves 7 are spaced circumferentially along the rotor frame 6, and a plurality of longitudinal rotor bars are 8 accommodated within the rotor grooves 7. The rotor slots 7 and rotor bars 8 have a corresponding, generally rectangular cross-sectional shape. In other words, the cross-sectional shape of the rotor slots 7 and the rotor bars 8 is rectangular, with the addition of chamfer region(s) 9, discussed in more detail below.

Furthermore, a chamfer region 9 is provided between each respective rotor groove 7 and rotor bar 8, at a position corresponding to a radially outer internal corner region 7*a* of the rotor groove. In the context of this disclosure, the term corner region is used to reflect the region of the rotor groove 7 at which the surface thereof transitions from extending generally in the radial direction of the rotor frame 6 to extending generally in the tangential direction of the rotor frame 6. Particularly, it should be noted, that the corner region 7*a* encompasses, e.g. a curvature smoothly transitioning between generally radially extending and generally tangentially extending surfaces.

The rotor groove 7 may comprise a slit 7*b* open towards an outer circumference of the rotor frame 6. Preferably, but not necessarily, the slit 7*b* extends axially along the whole length of the corresponding rotor groove 7. This enables, for example, the rotor bar 8 received within the rotor groove 7 to be punched via the slit 7*b* so as to cause the rotor bar 8 to slightly deform and at least partially press against the walls of the rotor groove, thereby securing the rotor bar 8 in place.

In such a case, the chamfer region 9 may preferably, but not necessarily, extend up to the slit 7*b* in the tangential direction of the rotor frame 6. In other words, the chamfer region 9 is positioned only at a radially outer internal corner region 7*a* of the rotor groove between the rotor groove 7 and the rotor bar 8, while leaving the portion of the rotor bar 8 at the slit 7*b* intact.

This is particularly advantageous, because the portion of the rotor bar 8 at the slit 7*b* contributes towards performance of the induction machine. To be more specific, the portion of the rotor bar 8 at the slit 7*b* contributes in starting torque performance and is particularly in e.g. pumping applications, where an electric motor is used to drive a pump.

That is, providing the chamfer region 9 as extend up (but not into) to the slit 7*b* in the tangential direction of the rotor frame 6, allows reducing eddy-current induced losses and thereby increasing the efficiency of the motor, while maintaining starting torque performance critical to pumping applications. According to an embodiment of the present disclosure, the chamfer region 9 has a relative magnetic permeability less than that of the rotor frame 6, and an electrical resistivity higher than that of the rotor bar 8. This can be achieved, for example by providing the chamfer region 9 as a gap between the respective rotor groove 7 and rotor bar 8. Alternatively, or in addition, the chamfer region 9 may be provided as any material having suitable properties, as described above, such as resin, particularly epoxy resin. Accordingly, examples of suitable materials for the rotor bar 8 include copper and aluminum, whereas an example of a suitable material for the rotor frame 6 include iron.

Advantageously, the relative permeability of the chamfer region 9 is at least an order of magnitude, preferably multiple orders of magnitude, lower than that of the rotor frame 6.

Preferably, but not necessarily, the chamfer region 9 has a relative magnetic permeability of 0-400, more preferably 0-40, most preferably 0-4. In the context of the present disclosure, the term relative magnetic permeability is used to denote the magnetic permeability of a material as compared to that of vacuum.

Advantageously, the electrical resistivity of the chamfer region 9 is at least an order of magnitude, preferably multiple orders of magnitude, higher than that of the rotor bar 8.

Preferably, but not necessarily, the chamfer region has an electrical resistivity in the range of $10^{-6}$-$10^{21}$ Ω·m, more preferably $10^{2}$-$10^{21}$ Ω·mm, most preferably $10^{12}$-$10^{21}$ Ω·mm.

According to an embodiment of the present disclosure, a minimum diameter of the chamfer region 9 is larger than a manufacturing-tolerances derived maximum clearance between the respective rotor groove 7 and rotor bar 8, if any. That is, any possible clearance due to the manufacturing and/or fitting between the respective groove 7 and rotor bar 8 do not constitute a chamfer region 9. It should be noted, that the term minimum diameter is used in this context to denote the length of the shortest line drawn across the cross-section of the chamfer region 9, through a center point thereof, as seen along the axial direction.

Preferably, but not necessarily, the chamfer region 9 has a tangentially extending width and a radially extending height of tat least 1 mm.

According to an embodiment of the present disclosure, a cross-sectional profile of the chamfer region 9 may be provided concave on a side abutting the rotor bar 8, as seen along a longitudinal direction of said rotor bar 8.

This is a particularly suitable arrangement in cases where the rotor bar 8 is fixed to the rotor groove 7 by punching the rotor bar when in place within the rotor groove 7, thereby causing the rotor bar 8 to slightly deform and press against the walls of the rotor groove 7.

Particularly, the concave shape of the chamfer region 9 prevents the chamfer region 9 from being excessively dissipated by the slight deformation, while still enabling the chamfer region to have a relatively small cross-sectional dimension, as compared to other cross-sectional shapes.

According to another embodiment of the present disclosure a cross-sectional profile of the chamfer region 9 is linear on a side abutting the rotor bar 8, as seen along a longitudinal direction of said rotor bar 8.

According to a further embodiment of the present disclosure, each respective rotor groove 7 and rotor bar 8 may comprise two chamfer portions 9 symmetrical with respect to each other along a radial symmetry axis. That is, each respective rotor groove 7 and rotor bar 8 may have two identical chamfer regions 9 at positions corresponding to both radially outer internal corner region 7*a* of the rotor groove. Such an arrangement is particularly advantageous, if the induction machine is to be operated in both rotational directions.

According to a further embodiment of the present disclosure, each respective rotor groove 7 and rotor bar 8 may comprise two chamfer portions 9 unsymmetrical with respect to each other along a radial symmetry axis. That is, each respective rotor groove 7 and rotor bar 8 may have two different chamfer regions 9 at positions corresponding to both radially outer internal corner region 7*a* of the rotor groove. Such an arrangement is particularly advantageous, if the induction machine is to be operated in both rotational directions with different emphasis regarding the chamfer region 9 for each operation direction. For example, two chamfer regions 9 with different cross-sectional areas may be provided for having different emphasis in attenuating losses caused by eddy currents when operating in different rotational directions.

According to embodiments of the present disclosure, multiple variations related to the dimensioning of the chamfer region 9 may be provided. In the context of this disclosure, the chamfer region 9 has a height in the radial direction of the rotor frame 6 and a width in the tangential direction of the rotor frame 6.

The chamfer portion 9 may naturally be provided with different height/width-ratios. For example, the height of the chamfer may be ¼-2 of, preferably equal with, the width of the chamfer region 9.

Moreover, in the context of this disclosure, the rotor bar 8 has a height in the radial direction of the rotor frame 6, and a width in the tangential direction of the rotor frame 6.

Preferably, but not necessarily, the height of the chamfer region 9 is 1-10% that of the rotor bar 8.

Preferably, but not necessarily, the width of the chamfer region 9 is 10-90% that of the rotor bar 8.

It should be noted, that the aspects discussed above regarding dimensioning of the chamfer region 9 may be provided independently or in any combination thereof.

According to an embodiment of the present disclosure, the electric induction machine is an electric motor having a pre-determined rotation direction.

In such a case, each respective rotor groove 7 and rotor bar 8 have a single chamfer region 9 at a position corresponding to a radially outer internal corner region 7*a* on a trailing side of the rotor groove 9 with respect to the pre-determined rotation direction.

This arrangement provides efficient removal of losses caused by eddy currents when the induction machine is used as a motor, while maintaining as much of the effective cross-sectional area of the rotor bar as possible.

According to an embodiment of the present disclosure, the electric induction machine is an electric generator having a pre-determined rotation direction.

In such a case, each respective rotor groove 7 and rotor bar 8 have a single chamfer region 9 at position corresponding to a radially outer internal corner region 7*a* on a leading side of the rotor groove 9 with respect to the pre-determined rotation direction.

This arrangement provides efficient removal of losses caused by eddy currents when the induction machine is used as a generator, while maintaining as much of the effective cross-sectional area of the rotor bar as possible.

Figure 6:
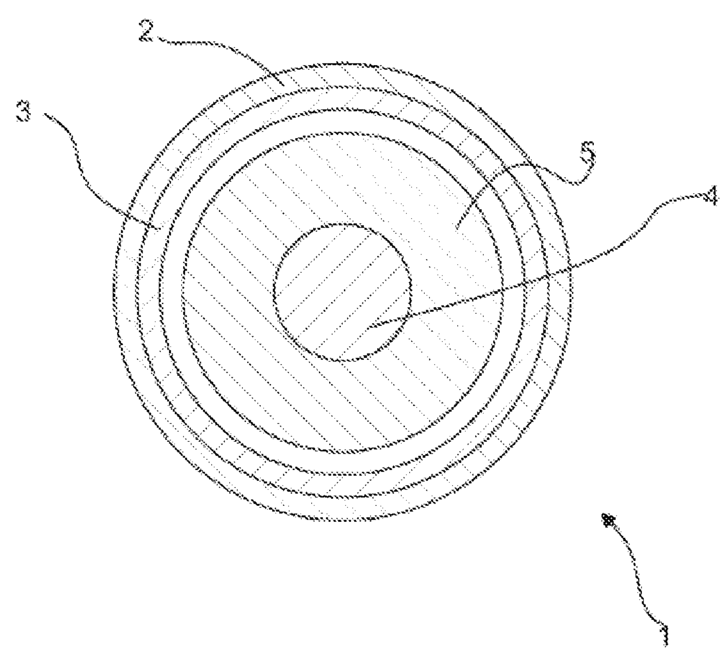

FIG. 6 schematically illustrates a cross-sectional view of an electric induction machine 1 according to the present disclosure, as seen along a longitudinal direction of the shaft 4 thereof. A housing 1 has an inner space, into which a stator assembly 3, known to the skilled person as such, is arranged. Moreover, within the inner space, a shaft 4 is rotatably supported so as to concentrically extend through the stator assembly 3. A rotor assembly 5 is fixed to and surrounding the shaft 4 within the inner space. The rotor assembly 5 is also disposed concentrically with and inside the stator assembly 3.

FIG. 1 illustrates a portion of an induction machine according to the present disclosure as a cross sectional view, seen along the longitudinal direction of the rotor bar 8. Particularly, a portion of a rotor frame 6 within a stator assembly 3 is depicted. The rotor frame 6 comprises a plurality of identical rotor slots 7, into which rotor bars 8 have been arranged. The rotor slots 7 have radially outer internal corner regions 7*a*, i.e. regions at which the cross-sectional form of the slot 7 transitions from a generally radial direction to a generally tangential direction. Moreover, a slit 7*b* is provided, through which the rotor slot 7 opens towards the outer circumference of the rotor frame 6.

Figure 2:
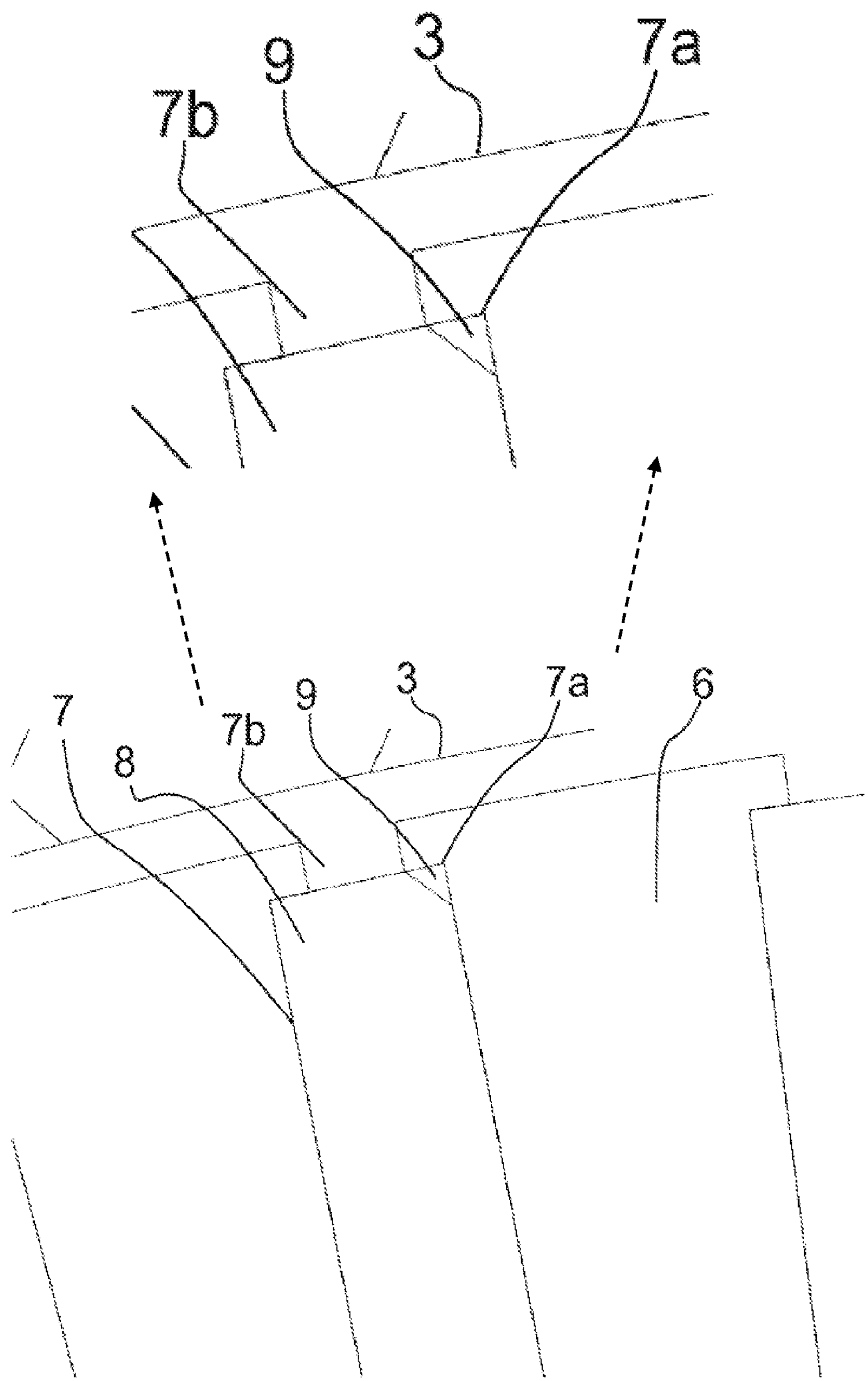
FIG. 2 schematically illustrates a detailed view of FIG. 1.

FIG. 2 illustrates a detailed view of the arrangement according to FIG. 1. Particularly, the shape of the chamfer region 9 is better illustrated as one of having a linear cross-sectional shape on the side abutting the rotor bar 8. Moreover, the chamfer region of FIG. 2 extends tangentially up to a corresponding edge of the slit 7*b*, i.e., towards but not to the slit 7*b*.

Figure 3:
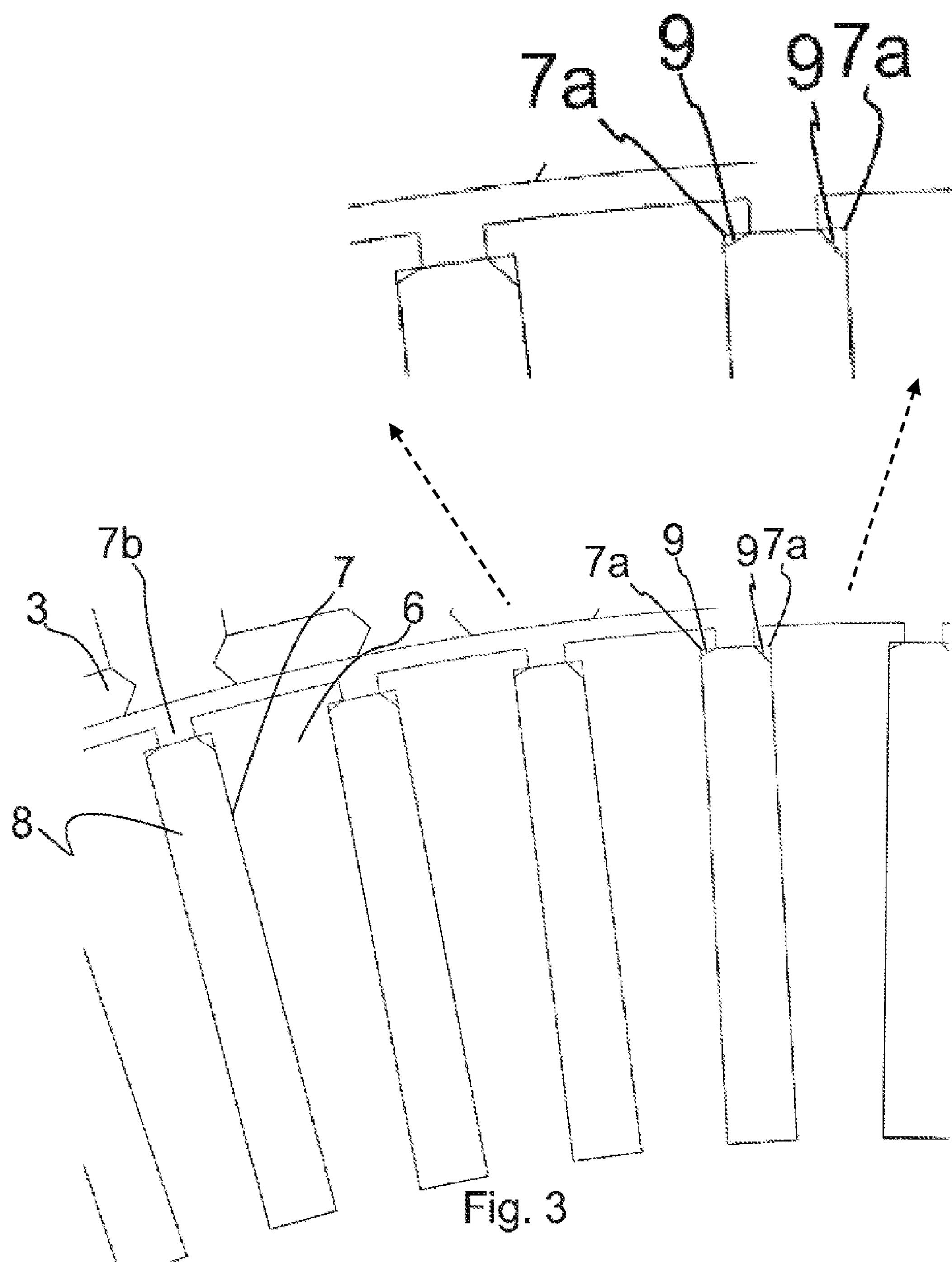
FIG. 3-FIG. 5 illustrates alternative arrangements of an induction machine according to the present disclosure as cross-sectional views, and FIG. 6 schematically illustrates a cross-sectional view of an electric induction machine according to the present disclosure.

FIG. 3 illustrates an alternative arrangement similar to that of FIG. 1 except for each corresponding rotor slot 7 and rotor bar 8 having two chamfer regions 9, positioned at both radially outer inner corners regions 7*a* of the respective rotor slot. Moreover, the chamfer regions 9 of FIG. 3 are unsymmetrical with respect to each other along a radially extending symmetry axis. That is, the two chamfer regions 9 of a respective rotor slot 7 and rotor bar 8 are different from each other. Particularly in the case of FIG. 3 the respective chamfer regions 9 differ from each other by having different height/width-ratios.

Figure 4:
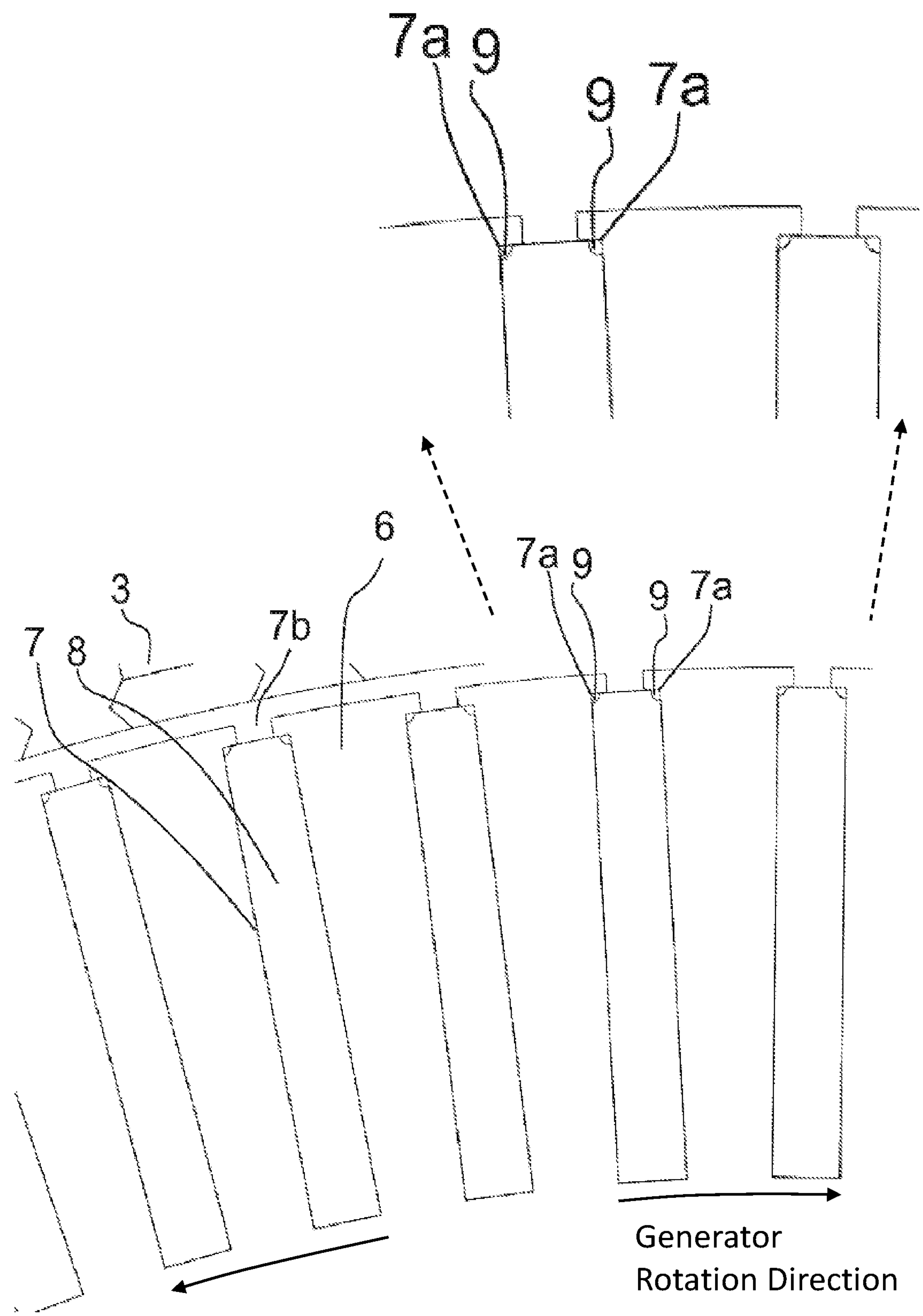

FIG. 4 illustrates another alternative arrangement similar to that of FIG. 3 except for the chamfer regions 9 of each rotor slot 7 and rotor bar 8 being symmetrical with respect to each other along a radially extending symmetry axis. Moreover, differing form the arrangement of FIG. 1, the cross-sectional profile of the chamfer regions 9 are concave on a side abutting the rotor bar 8, as seen along a longitudinal direction of said rotor bar. In the arrangement of FIG. 4, the chamfer region 9 does not extend tangentially up to the slit 7*b*, but up to a distance therefrom.

Figure 5:
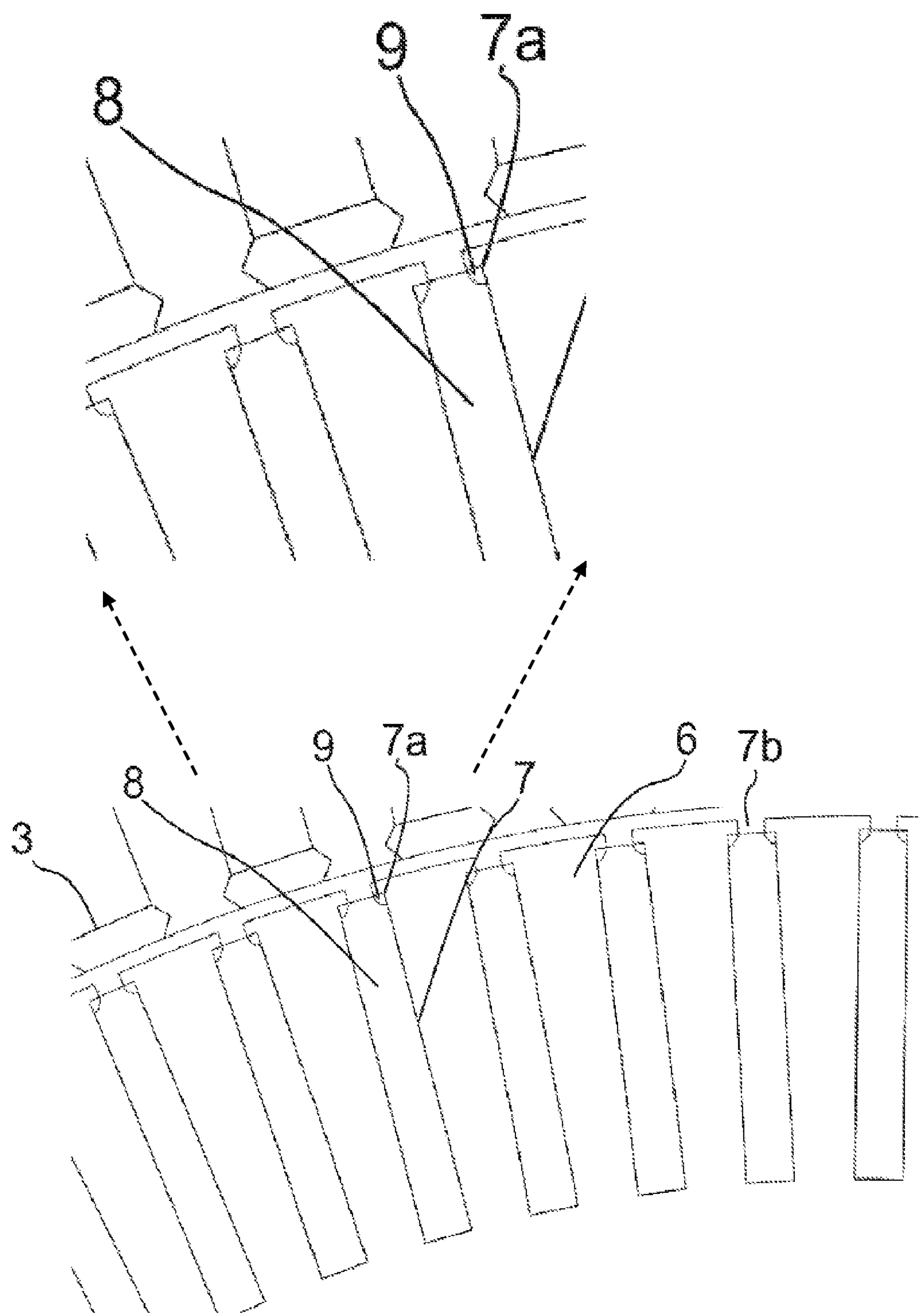

FIG. 5 illustrates another alternative arrangement similar to that of FIG. 4 except for the chamfer region 9 extending tangentially up to a corresponding edge of the slit 7*b*, i.e., towards but not to the slit 7*b*.

The invention claimed is:

1. An electric induction machine, comprising:
- a housing having an inner space;
- a stator assembly arranged annularly within the inner space of the housing;
- a shaft rotatably supported so as to concentrically extend through the stator assembly; and
- a rotor assembly fixed to and surrounding the shaft within the inner space, the rotor assembly being disposed concentrically with and inside the stator assembly, wherein the rotor assembly further comprises:
  - a cylindrical rotor frame;
  - a plurality of axially extending longitudinal rotor grooves spaced circumferentially along the rotor frame, each rotor groove being rectangular in shape;
  - a plurality of longitudinal rotor bars accommodated within the rotor grooves, each rotor bar comprising a rectangular shape corresponding to the rectangular shape of a corresponding rotor groove except for a chamfer region;
  - a plurality of slits, each slit extending radially outward from a radial outer side of each respective rotor groove to an outer circumference of the rotor frame; and
- the chamfer region formed in only each respective rotor bar as a gap between each respective rotor groove and rotor bar pair at a position corresponding to a radially outer internal corner region of the rotor groove,
- wherein the gap of the chamfer region does not extend in the tangential direction of the rotor frame beyond a tangentially closest side of the slit.

2. The electric induction machine according to claim 1, wherein the chamfer region has a relative magnetic permeability less than that of the rotor frame, and an electrical resistivity higher than that of the rotor bar.

3. The electric induction machine according to claim 2, wherein a minimum diameter of the chamfer region is larger than a manufacturing-tolerances derived maximum clearance between the respective rotor groove and rotor bar, if any.

4. The electric induction machine according to claim 3, wherein a cross-sectional profile of the chamfer region is concave on a side abutting the rotor bar, as seen along a longitudinal direction of said rotor bar.

5. The electric induction machine according to claim 1, wherein a cross-sectional profile of the chamfer region is linear on a side abutting the rotor bar, as seen along a longitudinal direction of said rotor bar.

6. The electric induction machine according to claim 1, wherein each respective rotor groove and rotor bar pair comprises two chamfer portions symmetrical with respect to each other along a radial symmetry axis.

7. The electric induction machine according to claim 1, wherein each respective rotor groove and rotor bar pair comprises two chamfer portions unsymmetrical with respect to each other along a radial symmetry axis.

8. The electric induction machine according to claim 1, wherein the chamfer region has a height in the radial direction of the rotor frame fat and a width in the tangential direction of the rotor frame, wherein the height of the chamfer is ¼-2 of the width of the chamfer region.

9. The electric induction machine according to claim 8, wherein the rotor bar has a height in the radial direction of the rotor frame, and wherein the height of the chamfer region is 1-10% that of the rotor bar.

10. The electric induction machine according to claim 9, wherein the rotor bar has a width in the tangential direction of the rotor frame, and wherein the width of the chamfer region is 10-90% that of the rotor bar.

11. The electric induction machine according to claim 1, wherein the electric induction machine is an electric motor having a pre-determined rotation direction,
- wherein each respective rotor groove and rotor bar pair have a single chamfer region at position corresponding to a radially outer internal corner region on a trailing side of the rotor groove with respect to the pre-determined rotation direction.

12. The electric induction machine according to claim 1, wherein the electric induction machine is an electric generator having a pre-determined rotation direction, wherein each respective rotor groove and rotor bar pair have a single chamfer region at position corresponding to a radially outer internal corner region on a leading side of the rotor groove with respect to the pre-determined rotation direction.

13. The electric induction machine according to claim 1, wherein a minimum diameter of the chamfer region is larger than a manufacturing-tolerances derived maximum clearance between the respective rotor groove and rotor bar, if any.

14. The electric induction machine according to claim 1, wherein a cross-sectional profile of the chamfer region is concave on a side abutting the rotor bar, as seen along a longitudinal direction of said rotor bar.

15. The electric induction machine according to claim 8, wherein the rotor bar has a width in the tangential direction of the rotor frame, and wherein the width of the chamfer region is 10-90% that of the rotor bar.

16. The electric induction machine according claim 5, wherein each respective rotor groove and rotor bar pair comprises two chamfer portions symmetrical with respect to each other along a radial symmetry axis.

17. The electric induction machine according to claim 2, wherein the electric induction machine is an electric motor having a pre-determined rotation direction, wherein each respective rotor groove and rotor bar pair have a single chamfer region at position corresponding to a radially outer internal corner region on a trailing side of the rotor groove with respect to the pre-determined rotation direction.

18. The electric induction machine according to claim 2, wherein the electric induction machine is an electric generator having a pre-determined rotation direction, wherein each respective rotor groove and rotor bar pair have a single chamfer region at position corresponding to a radially outer internal corner region on a leading side of the rotor groove with respect to the pre-determined rotation direction.

19. The electric induction machine according to claim 2, wherein a cross-sectional profile of the chamfer region is concave on a side abutting the rotor bar, as seen along a longitudinal direction of said rotor bar.

* * * * *